United States Patent [19]  
Weiberg

[11] 3,721,075  
[45] March 20, 1973

[54] STRIPPING MACHINE  
[75] Inventor: Rüdiger Weiberg, Braunschweig, Germany  
[73] Assignee: Maschinenfabrik August Herbort, Braunschweig, Germany  
[22] Filed: July 13, 1971  
[21] Appl. No.: 162,040

Related U.S. Application Data  
[63] Continuation-in-part of Ser. No. 77,264, Oct. 1, 1970.

[30] Foreign Application Priority Data  
Aug. 6, 1970  Germany ................... G 70 29 548.6

[52] U.S. Cl. ........................................ 56/13.5, 56/130  
[51] Int. Cl. ........................ A01d 55/26, A01d 45/22  
[58] Field of Search ............... 56/126–130, 219–224, 56/153–158, 14.1, 14.2, 14.3, 14.4, 14.5, 12.8; 171/17, 130; 209/136, 137, 138, 139

[56] References Cited  
UNITED STATES PATENTS

| | | | |
|---|---|---|---|
| 751,073 | 2/1904 | Helgerson | 56/130 |
| 1,259,465 | 3/1918 | Sanford | 56/126 |
| 1,370,919 | 3/1921 | Schaefer | 56/130 |
| 2,022,779 | 12/1935 | Peppard, Jr. | 56/126 |
| 2,084,049 | 6/1937 | Rosenrold | 56/219 |
| 3,408,797 | 11/1968 | Currence | 56/13.5 |
| 1,218,011 | 3/1917 | Spikes | 56/130 |
| 1,334,933 | 3/1920 | Hamilton | 56/219 |
| 1,555,695 | 9/1925 | Novak | 56/130 |
| 3,217,473 | 11/1965 | Lawrie | 56/14.4 |
| 3,530,652 | 9/1970 | Long et al. | 56/12.8 |
| 3,282,036 | 11/1966 | Paulson et al. | 56/13.3 |
| 2,974,467 | 3/1961 | Long | 56/128 |
| 3,405,750 | 10/1968 | Weirauch | 146/1 R |
| 2,445,162 | 7/1948 | Wallace | 56/34 |
| 1,180,148 | 4/1916 | Hedrick | 171/130 |
| 3,107,475 | 10/1963 | Gustafson | 56/328 |

Primary Examiner—Russell R. Kinsey  
Attorney—Michael S. Striker

[57] ABSTRACT

A picking machine for harvesting produce from plants which grow in elongated rows and are of the bush variety. A vehicle is capable of advancing longitudinally of the respective rows and carries stripping means extending transversely to the elongation of the rows and being operative for stripping produce off plants. Separating means, arranged behind the stripping means, admits the produce as well as foreign matter and separates the two, first by means of a series of rearwardly rising cleaning conveyors, all substantially arranged in parallel planes, with air streams provided between the cleaning conveyors for agitating and separating the produce from the foreign matter, second by filtering out the foreign matter which is greater in size than the produce and expelling it from the harvesting machine, and third by removing, by suction means, that foreign matter which is lighter in weight than the produce.

13 Claims, 4 Drawing Figures

STRIPPING MACHINE

CROSS-REFERENCES TO RELATED APPLICATIONS

This application is a continuation-in-part of my copending application, Ser. No. 77,264, filed Oct. 1, 1970.

BACKGROUND OF THE INVENTION

1. Field of the Invention

The present invention relates generally to harvesting machines, and more particularly to picking machines for picking or stripping produce from bush-type or brush-type plants growing in a row, such as bush beans and other tendril-type produce.

2. Description of the Prior Art

At the outset it should be understood that the term "produce" is intended to incorporate any growth which might be carried by bush-type plants, whether it be vegetable growth or fruit growth.

It is already known to have picking or stripping machines for the above-identified purpose. They generally use a vehicle which is generally self-propelled and which is provided with a stripping arrangement in form of an elongated roller turning about its longitudinal axis and being provided on its periphery with projecting stripping fingers which, when they engage the plant, strip off the produce and deposit it on a conveyor or other device from where it is carried away from the vicinity of the stripping device. In the known machines of this type, however, the roller is invariably so arranged that in operation of the machine it extends in substantial parallelism with the elongation of the row of plants which are being harvested. It is arranged at an upwardly inclined angle, as seen with the direction of advancement of the machine, in such a manner that the beans, or whatever other produce is involved, are stripped off over the entire height of the plant. A guide trough arcuately surrounds the roller with spacing from a portion of its periphery and both cooperate with the stripping fingers as well as serving in effect as a means of retaining and holding in position the respective plant for the period of time for which the produce is stripped off the plant by the stripping fingers.

These known machines perform their primary intended function, namely the picking of produce from plants of the type under discussion. However, they have been possessed of two significant drawbacks which the invention described in my copending application referred to above has now greatly alleviated.

One of these disadvantages is the fact that because of the arrangement of the stripping roller the operator of the vehicle is forced to advance the vehicle with great precision and with little lateral spacing along the respective row of plants; even small deviations in lateral direction would result in high losses of produce harvested, in that said produce would no longer be engaged and harvested by the stripping roller. Another disadvantage of equal seriousness is the fact that these known harvesting machines permit the harvesting of produce only from one row of plants at a time, evidently an undesirably time-consuming process where large-scale production is necessary. An attempt has been made to overcome this second difficulty by mounting several stripping rollers which are spaced from one another and so arranged that each of them acts upon a different row of plants as the vehicle advances. It was found, however, that there is not only a natural limit to the number of stripping rollers which can be so provided on a single stripping machine, with a self-evident increase in the complexity and expense of the machine, but also that the first-mentioned disadvantage is necessarily made even more pronounced with a thus-modified harvesting machine.

Briefly, the above-referred-to application discloses my invention which overcame the difficulties of those machines heretofore in use. This the invention accomplished by providing a vehicle capable of advancing longitudinally of the respective rows, stripping or picking means on the vehicle extending transversely to the elongation of the rows and operative for picking produce off the plants, receiving means behind the stripping means with reference to the direction of advancement and adapted for receiving produce stripped off the plants, and feeder means for engaging and drawing into the operative range of the stripping means the successive plants of the rows. The longitudinal axis of the stripping roller there provided, which constitutes a part of the stripping means, extends at least substantially horizontally as well as transversely to the elongation of the rows, and the acquisition means there provided is in form of a device which is arranged ahead of the stripping means and is inclined upwardly and forwardly of the direction of advancement of the vehicle at a predetermined angle so selected that as the plants are engaged by the acquisition means, they will be drawn towards the stripping means with their tips or upper ends being brought into contact with the stripping means first before the remainder of the plant comes into contact.

It was found that with this arrangement it was possible to provide the desired advantages while avoiding the aforementioned undesirable disadvantages, in that with that arrangement the harvesting can be carried out with the stripping roller extending transversely to the elongation of the rows without tearing the plants out of the ground.

Aside from the problems just described, dealing with removing the produce from the bushes or brush on which it grows, another problem which has been of great concern has been that of separating the produce and other foreign matter which the stripping machines pick up during the stripping process. It is commonly known that stripping machines will often pick up, in addition to the produce, soil, rocks, vines and branches associated with the shrub on which the produce grows, as well as other foreign particles commonly found in fields. Thus, even after the initial removal of the produce from the bushes, there still remains the task of removing and discarding the foreign matter mixed with the produce before the produce is ready for further processing. Until recently, separating the produce from the foreign matter picked up by the harvesting machine was for the most part performed by hand. The unavailability of suitable inexpensive apparatus for performing this function has resulted in lower efficiencies in harvesting operations.

SUMMARY OF THE INVENTION

In accordance with the invention as presently disclosed, a picking or stripping machine is provided which overcomes most of the above-mentioned problems. Thus, not only does the present invention provide a stripping machine which is capable of simultaneously picking produce from several rows of plants as initially disclosed in my copending application, but also here disclosed are improvements which make it possible to effectively separate the produce from foreign matter which the stripping machine likewise picks up during the stripping process.

It is, accordingly, an object of the present invention to overcome these above-mentioned disadvantages.

More particularly, it is an object of the present invention to provide an improved stripping or picking machine of the type under discussion which is not possessed of these disadvantages.

Still more specifically, it is an object of the invention to provide such a stripping machine which is capable of effectively separating the produce from other foreign matter which is simultaneously picked up by the stripping machine.

In pursuance of the above objects, and others which will become apparent hereafter, one feature of the invention resides in a stripping or picking machine for picking produce from plants growing in elongated rows, which stripping machine, briefly stated, comprises a vehicle capable of advancing longitudinally of the respective rows, stripping or picking means on the vehicle extending transversely to the elongation of the rows and operative for stripping produce off the plants, receiving means behind the stripping means with reference to the direction of advancement and adapted for receiving produce plucked off from the plants and foreign matter picked up by the stripping machine, feeder means for engaging and drawing into the operative range of the stripping means the successive plants of the rows, and separating means for separating the produce and the foreign matter.

According to the present invention, separating means are provided which consist of a plurality of separating elements, a first separating element consists of at least one upwardly and rearwardly extending conveyor belt for agitating the produce and the foreign matter and thereby separate them. Blower means are provided for producing a stream of air along the surfaces of the conveyor bearing the produce and the foreign matter, thereby increasing the amount of agitation to which these materials are subjected. After initial agitation by the conveyors and the stream of air, the produce and the foreign matter pass on to an extracting apparatus which is situated at the top portion of the conveyor. The extracting apparatus detaches whatever produce is still attached to the bushes or vines on which it grows, expels the matter which is greater than a predetermined size, and releases the now substantially refined produce onto conveyor means for transport to a storage bin. A final separating element is provided along the latter conveyor means prior to discharge into the storage bin, this last separating element providing suction means proximate to the surface of the conveyor means transporting the refined produce for extracting foreign matter which is of less than a predetermined weight, such as leaves, dust, and so on.

According to a currently preferred embodiment of the invention, the first separating element consists of a plurality of separating conveyor belts, arranged in substantially parallel planes, and leaving spaces therebetween which form separating channels through which the air streams flow. Additionally, the separating conveyors as well as the extracting means have widths which substantially correspond to the width of the stripping roller and nearly so the width of the stripping machine. Essentially, the present apparatus first agitates and separates the produce from the foreign matter, and to some extent detaches the produce from foreign matter. The larger and heavier components of the foreign matter are first separated and then discarded from the produce, and the smaller and lighter components of the foreign matter are then next separated and discarded from the produce. In order to insure that all the heavier and larger components of the foreign matter are removed in the first step, the separating apparatus involved in that step additionally separates the produce from the foreign matter when required.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
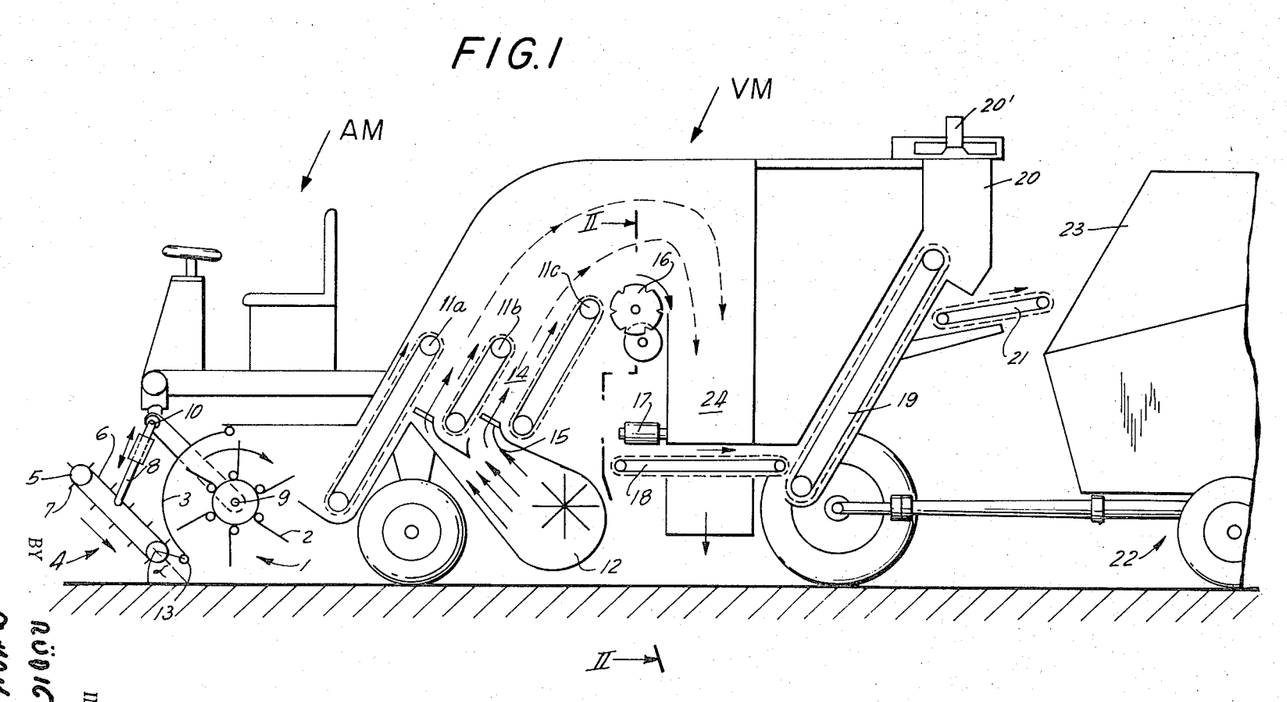
FIG. 1 is a diagrammatic side elevational view of a stripping machine embodying the present invention.
Figure 4:
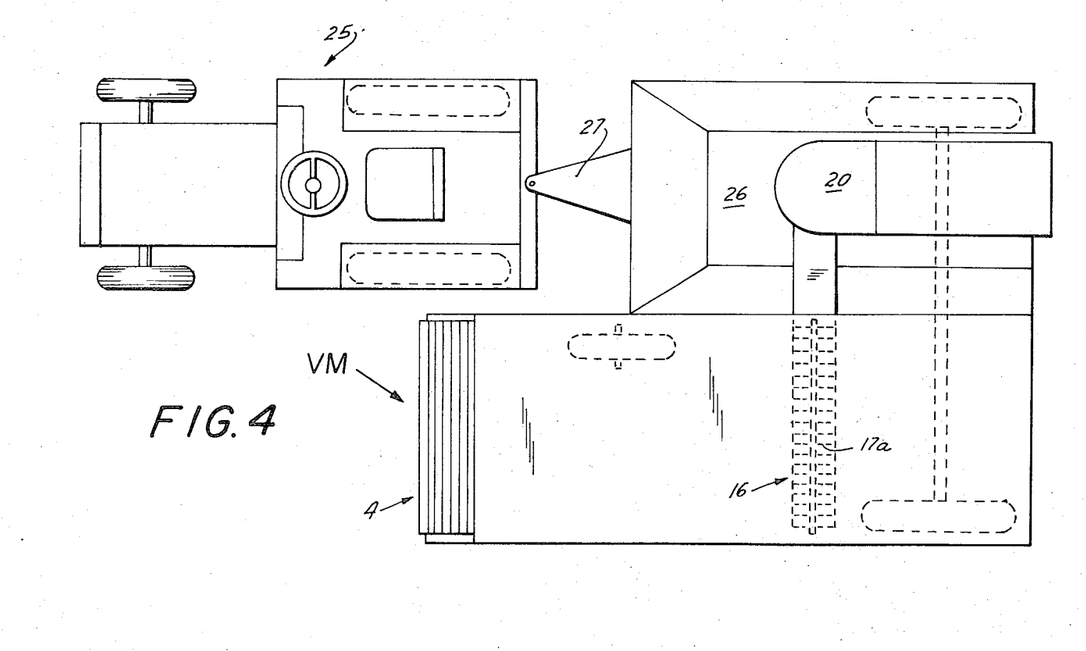
FIG. 4 is a top-plan view of an alternate embodiment incorporating the present invention.

As shown in FIG. 1, the stripping machine according to the present invention is in form of a vehicle means VM which advantageously will be self-propelled by an advancing means AM. However, as is shown in FIG. 4, the present invention could equally well be divorced of said advancing means AM, which in operation would thus somehow have to be advanced by external advancing means AM. Details of the vehicle and whatever propulsion arrangement is provided for it are not illustrated because they may be entirely conventional and are not part of the present invention. Merely for the sake of orientation a steering wheel and a seat for the vehicle operator have been diagrammatically shown in the drawing.

With respect to FIG. 1, it is pointed out that the stripping machine would in normal operation advance in direction towards the left-hand side of the drawing, following the elongation of the rows of plants which are to be stripped or picked. Reference numeral 1 in the drawing identifies an elongated stripping or picking roller which rotates about its longitudinal axis, the latter extending in at least substantial parallelism with the ground, that is extending at least substantially horizontally. The stripping roller 1 is provided with stripping fingers 2 whose construction is known in the art, and which strip the produce off the plants when the latter become engaged. As a practical matter, stripping fingers 2 will also be instrumental in tearing off at least part of the branches or vines on which the produce grows, as well as picking up rocks, soil and other objects that may be found in the field. All these items picked up in the field by stripping roller 1, aside from the produce, will hereafter be referred to as contaminants or foreign matter. A baffle 3 surrounds a portion of the periphery of stripping roller 1. Produce, such as beans or the like, as well as foreign matter, which is picked up by stripping roller 1 become deposited on the receiving means 11a which carries it away from stripping roller 1.

As more fully described in the above-referred-to copending application, a feeder means 4 is provided to make it possible to pick the produce from the plants of several parallel rows simultaneously and with a single stripping roller. The stripping roller 1 extends from one side of the machine to the other, that is substantially over the entire width of the machine. Feeder means 4 likewise extends transversely to the elongation of the rows over the entire width of the machine and is upwardly inclined in forward direction at an acquisition or drawing-in angle $\alpha$ as illustrated in FIG. 1. This angle $\alpha$ is variable depending on the prevailing ground and plant conditions. Feeder means 4 comprises a belt 6 which is guided over reversing rollers 5 and is provided on its outer side with a plurality of engaging elements 7 which may be in form of bars or the like. Advantageously, the direction of advancement of the belt 6, and accordingly that of the elements 7, will be counter to the direction of rotation of the stripping roller 1, as identified by the arrows which are respectively associated with the means 4 and with stripping roller 1.

The means 4 and the member 3 are pivotally connected about the axis 13. A hydraulic cylinder 8 is provided for varying the drawing-in angle by displacing the means 4 about the axis 13. A further turning axis 10 extends in parallelism with the axis of rotation line of the stripping roller 1, and permits the stripping roller 1 to be tilted upwardly away from the ground if necessary, in order to increase the spacing between the outer tips of the stripping fingers 2 and the ground where this may be required.

The feeder and stripping apparatus thus far described, serves the function of efficiently engaging and separating the produce to be harvested and consequently transported to the separating means hereafter to be described. Briefly, the feeding and stripping apparatus, described in considerably more detail in the copending application, as the vehicle advances, operates by means 4 engaging the successive plants in the various rows and drawing them into operative range of the stripping roller in such a manner that the stripping roller will first contact the tips or upper ends of the respective plants and then successively contact the remainder of the plate whereupon it will contact the tip or upper end of the next-following plant of the respective row and move it along over this plant down towards the roller thereof, with this being repeated with each and every one of the plants.

FIG. 1 also shows a presently preferred embodiment for the separating and cleaning of the produce after it has been accumulated by stripping roller 1. Three cleaning conveyors 11a, 11b and 11c are shown to extend upwardly and towards the rear of the vehicle, in relation to the direction of advancement. Conveyor 11a also forms part of the receiving means and is instrumental in carrying away all the material picked up by stripping roller 1 away from said roller. Conveyors 11a, 11b and 11c are shown to be of different lengths. However, the relative lengths for these conveyors to one another is not critical, and any suitable lengths for any of the conveyors can be chosen. If the separating area is generally located approximately centrally of the height of the vehicle, conveyor 11a will generally be chosen to have a length which extends from the region of stripping roller 1 to said central area. In the embodiment shown in FIG. 1, two additional conveyors, 11b and 11c are shown. These latter two conveyors, as well as conveyor 11 a, have their belts rotating in the same clockwise direction and are shown to lie in spaced, substantially parallel planes. The width of each of the rollers 11a, 11b and 11c corresponds to the width of stripping roller 1 whereby said cleaning conveyors extend substantially the entire width of the vehicle. A blower fan 12 is shown with duct openings between each of the adjacent cleaning conveyors. Sieves 15 are provided at the lower ends of the cleaning conveyors to prevent any produce or foreign matter from entering blower fan 12 while permitting the air flow out of said blower fan into the intercleaning conveyor spaces 14.

Extracting apparatus 16 is provided in the region of the top of cleaning conveyor 11c, and in the rear thereof, for accepting produce and/or foreign matter which appears at the top of cleaning conveyor 11c. Extracting apparatus 16 essentially corresponds in width to the width of cleaning conveyors 11c and consists of a plurality of spaced slotted disks and a plurality of spaced circular cutting blades which are at least partially meshed with said slotted disks, as will hereafter be described in connection with FIG. 4. The construction as well as the principles of operation are similar to those described in U.S. Pat. No. 3,405,750. Extracting apparatus 16 differs from that disclosed in the latter patent in that the slots in the present disks are provided around the periphery of said disks. The purpose of extracting apparatus 16 is twofold. First, in connection with produce which has already been severed from its branches, said produce and other like-sized foreign matter is permitted to enter the interdisk spaces and and drop under their own weight onto transverse conveyor 17. Second, extracting apparatus is effective to sever the produce from the brances on which it grows. As more fully described in the above-referred-to patent, an apparatus of this type is also effective in efficiently separating multiple pod accumulations and destemming and tip-severing of single pods. In effect, extracting apparatus 16 acts as an active filter whereby the produce, such as pea pods, are extracted or separated from the branches and other foreign matter. The extracted produce is then deposited on transverse conveyor 17 while the branches and other foreign matter, which will generally be of greater dimensions than that of the produce, cannot fall through the closely spaced slotted disks 16 and is transported by rotating slotted disk 16, expelled from the vehicle through discharge channel 24.

Figure 2:
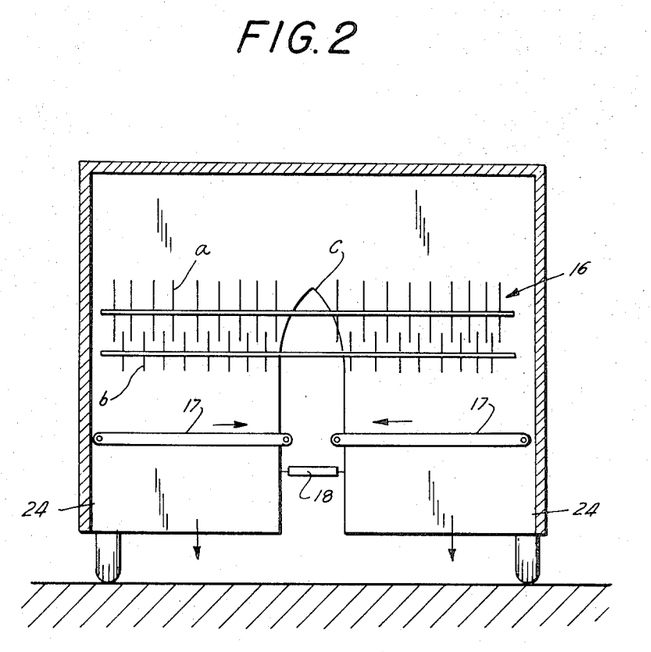
FIG. 2 is a cross-sectional view taken along line II—II in FIG. 1.

A better understanding of the apparatus utilized at this stage of the processing can be achieved by examining FIG. 2, which is a cross-sectional view taken along line II—II of FIG. 1. The stripping vehicle is shown with extracting apparatus extending almost the entire width thereof. The interdisk spacing of the disks with the slots $a$ is shown as well as the spacing of cutting disks $b$ which intermesh at least in part the external peripheries of disks $a$. Discharge channels 24 likewise extend almost the entire width of the stripping vehicle except for a central portion which is defined by separating wall $c$. Referring both to FIGS. 1 and 2, two transverse conveyors 17, each approximately half the width of the stripping vehicle, are positioned directly beneath extracting apparatus 16 for accepting produce and other like-sized foreign matter which passes through the interdisk network comprising extracting apparatus 16. The conveyor belts which accept the mixture of produce and foreign matter move in a direction from the sides of the vehicle towards the inside of the middle portion defined by separating wall $c$. Each conveyor 17 extends partly beyond separating wall $c$ and a longitudinal conveyor 18 is provided directly beneath transverse conveyors 17, the width of conveyor 18 being slightly larger than the distance of separation between transverse conveyors 17 within separating wall $c$. It will thus be appreciated that the mixture of produce and foreign matter which passes through extracting apparatus 16 falls under its own weight onto the transverse conveyors 17, is carried by transverse conveyors 17 towards conveyor 18 and deposited thereon, and transported by conveyor 18 to a point in the rear of separating channel 24 where a conveyor 19, rearwardly and upwardly directed, transports the mixture of produce and foreign matter towards the rear of the stripping vehicle. A suction apparatus 20, having an exhaust fan 20', is provided in the region of the top of conveyor 19 for a final cleaning step. As the mixture of produce and foreign matter come into the influence of suction apparatus 20, the smaller and lighter components of the foreign matter are extracted from the mixture and expelled from the vehicle. The remaining mixture, now substantially consisting of produce, is emptied onto a fast-moving conveyor 21 whose function it is to expel, with great force, the produce into bin 23 of trailer 22.

In operation, the produce, as well as earth, rocks, leaves, vines and bushes on which the produce grows, is picked up by stripping roller and deposited onto conveyor 11$a$ which carries it away from stripping roller 1 towards cleaning conveyors 11$b$ and 11$c$. Although any number of cleaning conveyor stages can be utilized, two are shown in FIG. 1. Each stage of cleaning conveyors consists of a conveyor and a separating channel 14 through which a flow of air is forcefully directed. The mixture of produce and foreign matter falls off the top of conveyor 11$a$ into the first separating channel where the mixture is constantly agitated in an upward direction both by the flow of forced air coming through screens 15 as well as by the action of the two conveyor belts which define the separating channel 14. The agitation of the mixture which takes place in separating channels 14 has the effect of both classifying the mixture into its various components by size and weight as well as separating some of the produce from the branches on which it is grown, mostly in cases where the produce has already partly been severed by the stripping roller 1. The components of the mixture within the first separating channel 14 are upwardly conveyed by cleaning conveyor 11$b$ and then dropped into the second separating channel 14 between conveyors 11$b$ and 11$c$ where further separation and classification takes place through the agitating action of the conveyor belts defining separating channel 14 as well as the forceful flow of air coming through sieve 15. Again the mixture of produce and foreign matter is carried upwardly and rearwardly by cleaning conveyor 11$c$ which empties the mixture onto extracting apparatus 16. As explained above, the produce as well as that component of the foreign matter which is of like size or smaller, falls, under its own weight, through the spaced slotted disks and cutting blades onto transverse rollers 17. In this capacity, the extracting apparatus 16 acts as a filter which extracts all items which are greater or shaped sufficiently different from the produce and expels them from the stripping vehicle through discharge channels 24. Thus, items such as branches, vines, larger rocks, leaves and other such items will pass over extracting apparatus 16 and be expelled. In those instances where produce is still attached to the branches on which it grows, extracting apparatus, by means of the slots and disks $a$ and cutting disks $b$, the produce will be severed from the branches as described in the above-referred-to patent, the branches now being expelled through discharge channel 24 an the produce passing onto conveyor belts 17 as before. It is apparent that at this stage of processing the produce is separated from the larger components of the mixture. Thus, the goods that are falling on transverse conveyor belts 17 now mostly consist of the produce as well as some smaller components of foreign matter, such as leaves, dust, small twigs and so on. This now partly refined mixture is transported inwardly as shown in FIG. 2 towards the center of the stripping vehicle where it is deposited on longitudinal conveyor 18 to bring it on the other side of discharge channels 24. There, the mixture is deposited on upwardly moving conveyor 19 which brings the mixture to suction apparatus 20. Suction apparatus removes those components of the mixture which are at the other extreme of those extracted by extracting apparatus 16. Thus, by providing strong suctional forces at the top of conveyor 19, the smaller components, leaves, dust, small twigs and the like, are upwardly extracted and expelled from the stripping machine. It is clear therefore that the mixture falling on conveyor 21 from conveyor 19 is now in a highly refined state, except for possibly some foreign matter which closely resembles the shape, size and weight of the produce being picked or stripped. The processed mixture is then propelled by fast-moving conveyor 21 to the rear of bin 23 of trailer 22.

Figure 3:
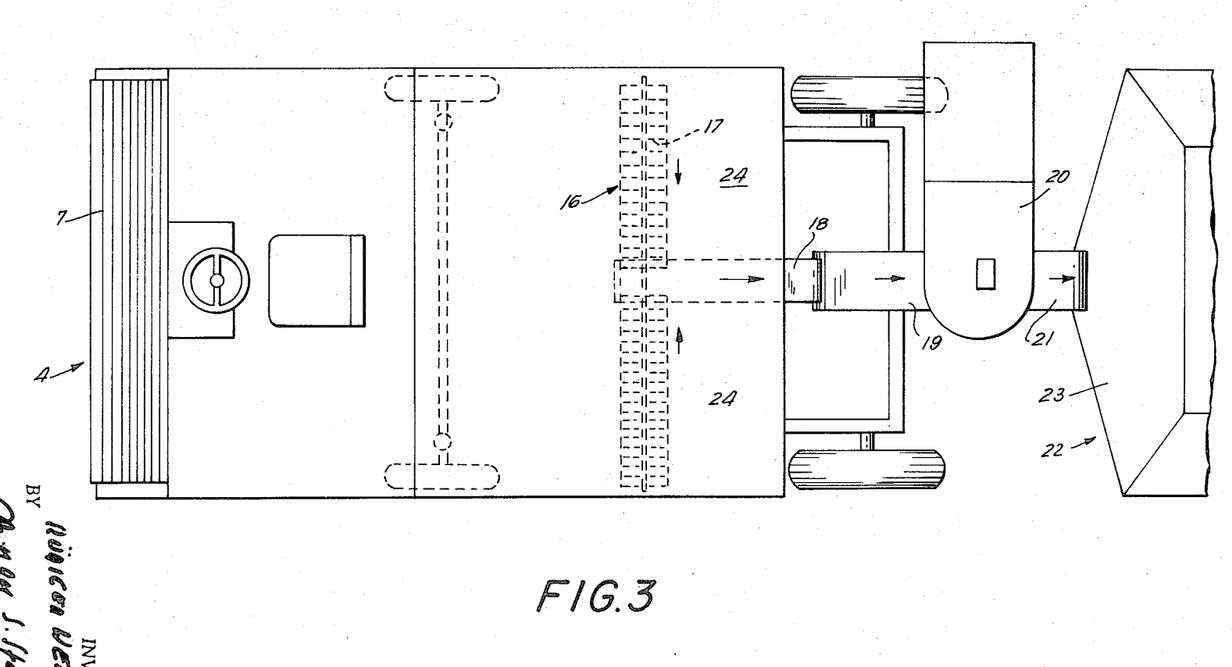
FIG. 3 is a top-plan view of the stripping machine of FIG. 1.

FIG. 3 is a top-plan view of the stripping machine of FIG. 1 and clearly shows the cooperating action of the conveyor belts 17, 18, 19 and 21 in carrying away the produce after it has fallen through the spaced disks of extracting apparatus 16. Also shown in the general location of suction apparatus 20 in the region where the mixture falls from conveyor 19 to conveyor 21.

Although the invention has up till now been described as being embodied in a moving vehicle, the invention as presently contemplated can equally well be in a structure which is divorced from motive or advancing means, as shown in FIG. 4. There, the stripping machine embodying the invention is advanced by tractor 25 which is connected to the stripping apparatus by means of connector 27. In this embodiment, the effective width of feeder means 4 as well as extracting apparatus 16 bears no relationship to the width of the tractor 25. The bin 26 is connected to the stripping apparatus described above, and a transverse belt 17a, situated beneath extracting apparatus 16, carries the initially refined produce mixture towards bin 26 where it is elevated to suction apparatus 20. Suction apparatus 20, being located directly above bin 26, can extract the latter components of foreign matter as the mixture falls into bin 26. Thus, in this embodiment, the need for a fast-moving belt 21 is obviated.

While the invention has been illustrated and described as embodied in a harvesting machine for picking or stripping produce in a field, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a stripping machine for stripping produce from plants growing in transversely spaced parallel rows and for separating the produce from foreign matter, in combination, vehicle means having a predetermined width and capable of advancing longitudinally of the respective rows, said vehicle means having forward and rearward portions, stripping means on said vehicle means in the region of said forward portion and operative for stripping produce from the plants of respective rows across substantially said entire predetermined width; baffle means on said vehicle means forwardly of said stripping means and having a substantially straight lower edge extending across substantially said entire width; feeding means on said vehicle means forwardly of said baffle means and operative to engage the plants across substantially said entire predetermined width and feed the plants rearwardly towards and beneath said lower edge for contact with said stripping means; receiving means on said vehicle means rearwardly of said stripping means and also extending across substantially said entire predetermined width for receiving stripped-off produce and dropping the same; and separating means on said vehicle means rearwardly of said receiving means and having at least a portion located below the latter, said separating means being adapted to separate the dropped produce from foreign matter picked up by said stripping means.

2. In a machine as defined in claim 1, wherein said separating means comprises at least one cleaning conveyor means on said vehicle means rearwardly of said receiving means and having at least a portion thereof below said receiving means, said cleaning conveyor means extending across substantially said entire predetermined width and being arranged to carry the produce and foreign matter upwardly and rearwardly of said vehicle means subsequently to being dropped by said receiving means onto said portion; and fan means on said vehicle means for providing upwardly directed air flow along a surface of said conveyor means whereby the combination of produce and foreign matter is agitated and thereby separated.

3. A machine as defined in claim 2, further comprising advancing means connected to said vehicle means and adapted to move the latter along the elongated rows of plants.

4. A machine as defined in claim 2, wherein a plurality of spaced cleaning conveyor means are provided on said vehicle rearwardly of said receiving means, all said cleaning conveyor means being oriented parallel to one another to form upwardly directed separating channels between respectively adjacent cleaning conveyor means which are arranged to permit the passage of said upwardly directed air flow.

5. In a machine as defined in claim 4, wherein sieve means are provided on said vehicle means in the lower regions of said separating channels for preventing the loss of produce at said lower regions while permitting the passage of said upwardly directed air flow.

6. A machine as defined in claim 2, wherein said separating means further comprises extracting means on said vehicle means rearwardly and upwardly of said cleaning conveyor means for receiving produce and foreign matter from said cleaning conveyor means and detaching the produce from the foreign matter, and separating the former from the latter.

7. A machine as defined in claim 6, wherein said extracting means is provided with means for selecting foreign matter having dimensions greater than a predetermined amount and expelling it out of said vehicle.

8. A machine as defined in claim 7, wherein said extracting means is provided with means for downwardly passing the produce and foreign matter having dimensions smaller than a predetermined amount through said extracting means.

9. A machine as defined in claim 8, further comprising conveying means on said vehicle means which is at least partially beneath said extracting means for receiving produce and foreign matter downwardly passed through said extracting means and conveying it upwardly and rearwardly towards the exterior of said vehicle means.

10. A machine as defined in claim 9, further comprising suction means on said vehicle means above said conveying means for removing foreign matter having less than a predetermined weight from the produce and foreign matter conveyed upwardly by said conveying means.

11. A machine as defined in claim 3, wherein said vehicle means is integrally connected to said advancing means.

12. A machine as defined in claim 11, further including a bin, attached to said vehicle means, and propelling means, arranged in the region of the top of said conveying means, for accepting produce and foreign matter from said conveying means and propelling it into said bin.

13. A machine as defined in claim 12, wherein said propelling means comprises a high velocity conveyor, at least a portion of which passes underneath the top end of said conveying means, whereby the produce and foreign matter fall off said conveying means and onto said propelling means.

* * * * *